US008482397B1

(12) United States Patent
Tajiri

(10) Patent No.: US 8,482,397 B1
(45) Date of Patent: Jul. 9, 2013

(54) DECELERATION-ACTIVATED BRAKE LIGHTS

(76) Inventor: Rex M. Tajiri, Honolulu, HI (US)

(*) Notice: Subject to any disclaimer, the term of this patent is extended or adjusted under 35 U.S.C. 154(b) by 539 days.

(21) Appl. No.: 12/762,982

(22) Filed: Apr. 19, 2010

Related U.S. Application Data

(60) Provisional application No. 61/179,676, filed on May 19, 2009.

(51) Int. Cl.
*G08B 21/00* (2006.01)
(52) U.S. Cl.
USPC ........... 340/467; 340/441; 340/464; 340/466; 340/479; 701/70; 701/71; 701/78; 701/79
(58) Field of Classification Search
USPC ........... 340/441, 464, 466, 467, 479; 701/70, 701/71, 78, 79
See application file for complete search history.

(56) References Cited

U.S. PATENT DOCUMENTS

| 4,107,647 A * | 8/1978 | Yoshino ................. 340/467 |
| 4,916,431 A * | 4/1990 | Gearey ................... 340/479 |
| 5,059,957 A * | 10/1991 | Todoriki et al. ............. 345/7 |
| 5,572,971 A | 11/1996 | Yokoyama |
| 5,725,075 A | 3/1998 | Chou |
| 6,278,364 B1 | 8/2001 | Robert |
| 6,587,044 B2 | 7/2003 | Ehrlich et al. |
| 6,864,786 B2 | 3/2005 | Speckhart et al. |
| 7,002,460 B2 | 2/2006 | Bolander et al. |
| 2002/0133282 A1 | 9/2002 | Ryan et al. |
| 2003/0052532 A1 | 3/2003 | Costello et al. |
| 2007/0016348 A1 * | 1/2007 | Long ........................ 701/49 |
| 2008/0309478 A1 * | 12/2008 | Morales ................... 340/467 |

* cited by examiner

*Primary Examiner* — Jennifer Mehmood
*Assistant Examiner* — Mark Rushing

(57) ABSTRACT

A deceleration-activated brake light system for a vehicle featuring a speed sensor, a brake sensor, a throttle sensor, and an engine brake switch; and a microcontroller operatively connected to a standard relay switch functioning to activate a standard brake light system of the vehicle, the microcontroller is configured to receive input signals from the sensors when the sensors detect deceleration of the vehicle more than a predetermined percent, coasting of the vehicle more than a predetermined amount of time, application of the brake pedal; or engagement of the auxiliary brake whereupon the microcontroller generates an output command to the relay to cause activation of the standard brake light system of the vehicle.

10 Claims, 2 Drawing Sheets

Diagram of Processing Unit (double box) with sensor inputs (dashed box), outputs (single box), and power (black/shaded box).

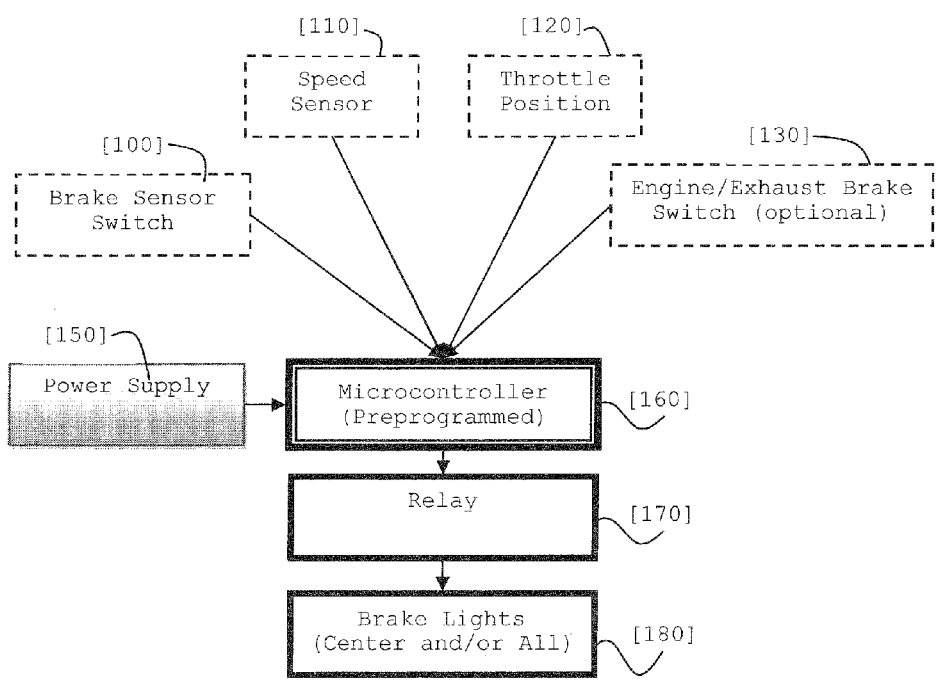
Figure 1: Diagram of Processing Unit (double box) with sensor inputs (dashed box), outputs (single box), and power (black/shaded box).

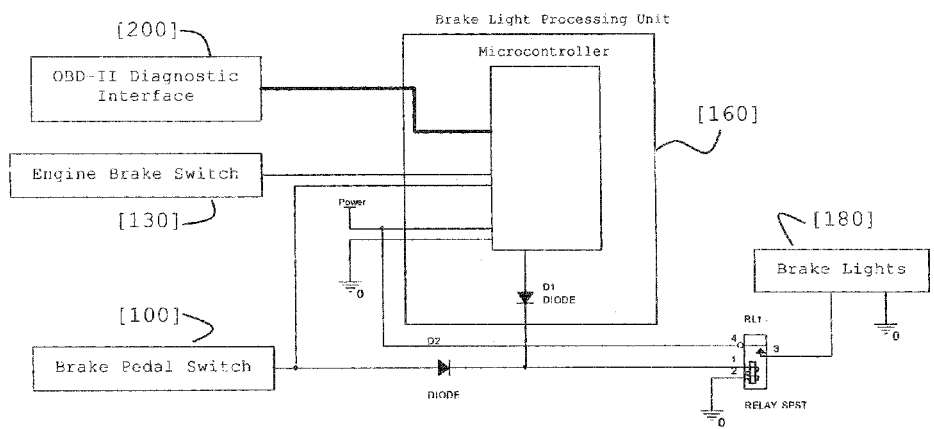
Figure 2: Aftermarket solution using an OBD-II Connector
The "Engine Brake Switch" above may also be "Engine and/ or Exhaust Brake Switch"

DECELERATION-ACTIVATED BRAKE LIGHTS

CROSS REFERENCE

This application claims priority to U.S. provisional application Ser. No. 61/179,676 filed May 19, 2009, the specification of which is incorporated herein by reference in its entirety.

FIELD OF THE INVENTION

The present invention is directed vehicle brake systems, more particularly to an electronic system for engaging vehicle brake lights any time the vehicle is decelerating and/or coasting, e.g., not necessarily in combination with the use of the brake pedal.

BACKGROUND OF THE INVENTION

Many rear end collisions occur because drivers cannot anticipate the deceleration of a vehicle ahead of them unless the driver of the vehicle ahead of them is applying the brakes. The present invention features a deceleration-activated brake light system for engaging a vehicle's brake lights any time the vehicle is decelerating and/or coasting, e.g., not necessarily in combination with the use of the brake pedal. This alerts drivers that the vehicle is slowing down. The system of the present invention may help prevent rear-end collisions and enhance road safety Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a deceleration-activated brake light system for a vehicle. In some embodiments, the system comprises a speed sensor adapted to detect if the vehicle is decelerating or coasting; a brake sensor switch adapted to determine if deceleration of the vehicle is caused by application of a brake pedal of the vehicle; a throttle position sensor adapted to determine if a gas pedal of the vehicle is pressed; an engine/exhaust brake switch adapted to determine if an auxiliary brake of the vehicle is engaged; and a microcontroller operatively connected to a standard relay switch, the relay switch functioning to activate a standard brake light system of the vehicle, the microcontroller is operatively connected to the speed sensor, the brake sensor switch, the throttle position sensor, and the engine/exhaust brake switch. The microcontroller is configured to receive a speed sensor input signal from the speed sensor when the speed sensor detects deceleration of the vehicle more than a predetermined percent or the speed sensor detects coasting of the vehicle more than a predetermined amount of time, whereupon the microcontroller generates an output command to the relay to cause activation of the standard brake light system of the vehicle. The microcontroller is configured to receive a brake sensor input signal from the brake sensor switch when the brake sensor switch detects application of the brake pedal whereupon the microcontroller generates an output command to the relay to cause activation of the standard brake light system of the vehicle. The microcontroller is configured to receive an engine/exhaust brake switch input signal from the engine/exhaust brake switch when the engine/exhaust brake switch detects the auxiliary brake is engaged whereupon the microcontroller generates an output command to the relay to cause activation of the standard brake light system of the vehicle.

In some embodiments, the system functions to activate a single brake light of the standard brake system of the vehicle. In some embodiments, the system functions to activate a plurality of brake lights of the standard brake system of the vehicle.

In some embodiments, the microcontroller is configured to receive the speed sensor input signal from the speed sensor when the speed sensor detects deceleration of the vehicle more than about 10%. In some embodiments, the microcontroller is configured to receive the speed sensor input signal from the speed sensor when the speed sensor detects deceleration of the vehicle more than about 15%. In some embodiments, the microcontroller is configured to receive the speed sensor input signal from the speed sensor when the speed sensor detects coasting of the vehicle more than about 4 seconds. In some embodiments, the microcontroller is configured to receive the speed sensor input signal from the speed sensor when the speed sensor detects coasting of the vehicle more than about 6 seconds.

In some embodiments, the microcontroller is configured to receive a throttle input sensor signal from the throttle position sensor when the throttle position sensor detects the gas pedal being pressed whereupon the microcontroller overrides the speed sensor input signal and the brake sensor input signal and the engine/exhaust brake switch input signal and stops the output command to the relay, thereby deactivating the brake light system of the vehicle. In some embodiments, the microcontroller is operatively connected to an OBD-II connector.

BRIEF DESCRIPTION OF THE DRAWINGS

FIG. 1 is a schematic representation of components of the system of the present invention, for example a processing unit (double box) with sensor inputs (dashed box), outputs (single box), and power (black/shaded box).

FIG. 2 is a schematic representation of a system of the present invention (e.g., an aftermarket system) using an OBD-II connector.

DESCRIPTION OF PREFERRED EMBODIMENTS

The following is a listing of numbers corresponding to a particular element referred to herein:
100 Brake Switch Sensor
110 Speed Sensor
120 Throttle Position Sensor
130 Engine/Exhaust Brake Switch (Optional)
150 Power Supply
160 Microcontroller
170 Relay
180 Brake Lights (center and/or all)
200 OBD-II Connector or equivalent on board diagnostic plug.

The present invention features a deceleration-activated brake light system for engaging a vehicle's brake lights any time the vehicle is decelerating and/or coasting, e.g., not necessarily in combination with the use of the brake pedal.

The deceleration-activated brake light system of the present invention is not a replacement for current brake systems where the brake lights are controlled by the brake pedal. Instead the deceleration-activated brake light system is a supplement to the standard braking system.

Referring to FIG. 1, the deceleration-activated brake light system of the present invention is designed to utilize various sensor inputs [100-130] as well as a power input [150] to a brake light processing unit. This processing unit features a microcontroller [160] preloaded with the appropriate software that is well known in the art. This microcontroller [160] drives a relay [170] used to switch the brake lights on and off.

The microcontroller [160] of the system of the present invention is configured to analyze the various sensor inputs to determine the state of the vehicle. In some embodiments, the sensors include (but are not limited to) a speed sensor [110], a brake switch sensor [100], a throttle position sensor [120], and/or an Engine/Exhaust Brake Switch [130]. The speed sensor [110] is adapted to detect whether the car is coasting or decelerating. These sensors are preinstalled in all new vehicles, additional sensors are not required. The brake switch sensor [100] is adapted to determine if deceleration is caused by application of the brake pedal. The throttle position sensor [120] is adapted to determine if the driver is pressing the gas. For example, deceleration may occur on a steep incline even if the driver is applying the gas albeit not as much, in this case the system of the present invention may not necessarily engage. The Engine/Exhaust Brake Switch [130] is adapted to determine if the auxiliary brake is engaged. In this case, the system of the present invention will activate the brake lights and deactivate once the brake switch is turned off. In some embodiments, the system of the present invention will activate the brake lights if the below mentioned parameters are met and deactivate once the brake switch is turned off. The auxiliary brake switch may be engaged while accelerating but actual mechanical engagement occurs only when the gas pedal is not pressed.

The microcontroller [160] is adapted to determine if the vehicle is decelerating more than a predetermined percent or coasting more than a predetermined amount of time. If the microcontroller [160] detects such conditions the microcontroller [160] generates output commands to drive the relay [170] to cause the brake lights [180] to be activated. These parameters (e.g., percentage of deceleration, coasting time, etc.) may be determined by a manufacturer. Examples of the parameters include but are not limited to: 1) Vehicle speed has decreased by about 10% or more; 2) Vehicle speed has decreased by about 15% or more; 3) The driver has neither applied the gas or brakes (coasting) for more than about 4 seconds; or 4) The driver has neither applied the gas or brakes (coasting) for more than about 4 seconds. A combination and variation of both may also be implemented at the discretion of the manufacturer.

In some embodiments, the system of the present invention only activates a single brake light (e.g., the center brake light) as a warning or to get the attention of following motorists. In some embodiments, this the system of the present invention can switch on any combination of the brake lights that are installed on the vehicle.

Since this system is used as a supplement to the standard braking system, it will not affect the standard braking functions of the vehicle. If the brake pedal is pressed, then the standard brake light system will switch the brake lights on. In some embodiments, this system works will not affect other braking or safety features including, but not limited to ABS, electronic brake force distribution (EBD), traction control, and/or stability control.

As shown in FIG. 2, in some embodiments, the system of the present invention can be installed as an aftermarket system. In this embodiment, the system is operatively connected to an OBD-II connector [200] or the like Such connectors are well known to one of ordinary skill in the art. For example, such connectors are standard connectors and diagnostic interfaces included on all modern vehicles sold in the United States after 1996. This diagnostic interface supports 5 different communication protocols: SAE J1850 PWM, SAE J1850 VPW, ISO 9141-2, ISO 14230 KWP2000, and ISO 15765 CAN. These protocols as well as other diagnostic interface parameters are defined by the International Organization for Standardization (ISO) and the Society of Automotive Engineers (SAE), and are well known in the art. In some embodiments, the present Brake Light System will operate within the standards defined in the following documents: SAE J1962, J1850, J1978, J1979, J2012, J2178-1, J2178-2, J2178-3, J2178-4, J2284-3; ISO 9141, 11898, 14230, and 15765.

Each of the OBD-II diagnostic interfaces use a serial data bus to convey factory installed on-board sensor data. This includes among other information, data from the speed sensor [110], and throttle position [120]. Thus, there is no need to add additional sensors to the vehicle. In this embodiment, the OBD-II interface [200] would provide inputs to the brake light processing unit [160]. This would in turn drive a relay [170] that can control the lights. The Engine/Exhaust brake switch that is used on large trucks (light to heavy duty/all classes) in some embodiments can be used to drive the brake lights via a microcontroller [160] and a relay [170]. There is also an input to the microcontroller [160] for the brake pedal switch [100]. This brake pedal switch [100] is only used by the microcontroller [160] to determine if the brake lights are already on. Since the standard braking system is still used, this brake pedal switch [100] input is used to disable the microcontroller [160].

In some embodiments, the brake pedal switch [100] is excluded. This would have the advantage of simplifying the wiring by reducing the number of wires going to the device. This may cause the microcontroller [160] to drive the brake lights [180] at the same time as the traditional brake system. To ensure that the brake lights [180] are always driven by a constant current, a simple logical or gate can be used where the two lines are attached to determine when the brake lights should engage. If a constant current is determined unnecessary by the manufacturer, the logic gate can be excluded.

As used herein, the term "about" refers to plus or minus 10% of the referenced number. For example, an embodiment wherein the system is activated if the vehicle decelerates about 10% includes an embodiment wherein the system is activated if the vehicle decelerates between 9 and 11%.

The disclosures of the following U.S. Patents are incorporated in their entirety by reference herein: U.S. Pat. Application No. 2003/0052532; U.S. Pat. No. 5,572,971; U.S. Pat. No. 6,864,786; U.S. Pat. No. 6,278,364; U.S. Pat. No. 6,587,044; U.S. Pat. No. 5,725,075; U.S. Pat. No. 7,002,460.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A deceleration-activated brake light system for a vehicle, said system comprising:
   (a) a speed sensor adapted to detect if the vehicle is decelerating or coasting;
   (b) a brake sensor switch adapted to determine if deceleration of the vehicle is caused by application of a brake pedal of the vehicle;
   (c) a throttle position sensor adapted to determine if a gas pedal of the vehicle is pressed;
   (d) an engine/exhaust brake switch adapted to determine if an engine/exhaust brake of the vehicle is engaged; and
   (e) a microcontroller operatively connected to a standard relay switch, the relay switch functioning to activate a standard brake light system of the vehicle, the microcontroller is operatively connected to the speed sensor, the brake sensor switch, the throttle position sensor, and the engine/exhaust brake switch, wherein the microcontroller is configured to:
      (i) receive a speed sensor input signal from the speed sensor when the speed sensor detects deceleration of the vehicle more than a predetermined percent or the speed sensor detects coasting of the vehicle more than a predetermined amount of time, whereupon the microcontroller generates an output command to the relay to cause activation of the standard brake light system of the vehicle;
      (ii) receive a brake sensor input signal from the brake sensor switch when the brake sensor switch detects application of the brake pedal whereupon the microcontroller generates an output command to the relay to cause activation of the standard brake light system of the vehicle; and
      (iii) receive an engine/exhaust brake switch input signal from the engine/exhaust brake switch when the engine/exhaust brake switch detects the engine/exhaust brake is engaged whereupon the microcontroller generates an output command to the relay to cause activation of the standard brake light system of the vehicle.

2. The system of claim 1, wherein the system functions to activate a single brake light of the standard brake system of the vehicle.

3. The system of claim 1, wherein the system functions to activate a plurality of brake lights of the standard brake system of the vehicle.

4. The system of claim 1, wherein the microcontroller is configured to receive the speed sensor input signal from the speed sensor when the speed sensor detects deceleration of the vehicle more than about 10%.

5. The system of claim 1, wherein the microcontroller is configured to receive the speed sensor input signal from the speed sensor when the speed sensor detects deceleration of the vehicle more than about 15%.

6. The system of claim 1, wherein the microcontroller is configured to receive the speed sensor input signal from the speed sensor when the speed sensor detects coasting of the vehicle more than about 4 seconds.

7. The system of claim 1, wherein the microcontroller is configured to receive the speed sensor input signal from the speed sensor when the speed sensor detects coasting of the vehicle more than about 6 seconds.

8. The system of claim 1, wherein the microcontroller is configured to receive a throttle input sensor signal from the throttle position sensor when the throttle position sensor detects the gas pedal being pressed whereupon the microcontroller overrides the speed sensor input signal and the brake sensor input signal and the engine/exhaust brake switch input signal and stops the output command to the relay, thereby deactivating the brake light system of the vehicle.

9. The system of claim 1, wherein the microcontroller is operatively connected to an OBD-II connector or similar on-board-diagnostics/electronic control unit connector/interface.

10. A deceleration-activated brake light system for a vehicle, said system comprising:
   (a) a speed sensor adapted to detect if the vehicle is decelerating or coasting;
   (b) a brake sensor switch adapted to determine if deceleration of the vehicle is caused by application of a brake pedal of the vehicle;
   (c) a throttle position sensor adapted to determine if a gas pedal of the vehicle is pressed;
   (d) an engine/exhaust brake switch adapted to determine if an engine/exhaust brake of the vehicle is engaged; and
   (e) a microcontroller operatively connected to a standard relay switch, the relay switch functioning to activate a standard brake light system of the vehicle, the microcontroller is operatively connected to the speed sensor, the brake sensor switch, the throttle position sensor, and the engine/exhaust brake switch, wherein the microcontroller is configured to:
      (i) receive a speed sensor input signal from the speed sensor when the speed sensor detects deceleration of the vehicle more than a predetermined percent or the speed sensor detects coasting of the vehicle more than a predetermined amount of time, whereupon the microcontroller generates an output command to the relay to cause activation of the standard brake light system of the vehicle;
      (ii) receive a brake sensor input signal from the brake sensor switch when the brake sensor switch detects application of the brake pedal whereupon the microcontroller generates an output command to the relay to cause activation of the standard brake light system of the vehicle;
      (iii) receive an engine/exhaust brake switch input signal from the engine/exhaust brake switch when the engine/exhaust brake switch detects the engine/exhaust brake is engaged whereupon the microcontroller generates an output command to the relay to cause activation of the standard brake light system of the vehicle; and
      (iv) receive a throttle input sensor signal from the throttle position sensor when the throttle position sensor detects the gas pedal being pressed whereupon the microcontroller overrides the speed sensor input signal and the brake sensor input signal and the engine/exhaust brake switch input signal and stops the output command to the relay, thereby deactivating the brake light system of the vehicle; the microcontroller receives all input data from the vehicle's existing electronic control unit (ECU) or a separate set of sensors incorporated to receive all the required signals and data.

* * * * *